Patented Feb. 1, 1944

2,340,305

UNITED STATES PATENT OFFICE 2,340,305

PROCESS FOR BREAKING PETROLEUM EMULSIONS

Melvin De Groote, University City, Bernhard Keiser, Webster Groves, and Arthur F. Wirtel, Kirkwood, Mo., assignors to Petrolite Corporation, Ltd., Wilmington, Del., a corporation of Delaware No Drawing. Application April 27, 1942, Serial No. 440,749

5 Claims. (Cl. 252—340)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned, is of significant value in removing impurities, particularly inorganic salts, from pipeline oil.

The composition of matter employed as the demulsifier of our process, is obtained by blowing or oxidation of hydroxyacetylated ricinoleic compounds, particularly, triricinolein and hydroxyacetylated castor oil. The manner of blowing or oxidizing such products is substantially the same as is employed to oxidize or blow castor oil, ricinoleic acid, and the like.

It is well known that oxidized oils can be obtained from castor oil, ricinoleic acid and various derivatives of ricinoleic acid, such as monoricinolein, diricinolein and polyricinoleic acids. They are produced by the common practice of blowing or oxidizing castor oil and similar fatty oils or acids, particularly non-drying unsaturated fatty oils, by means of a gaseous medium, such as air, oxygen, ozone, or ozonized air. The gaseous medium, such as air, may be moist or dry and the oxidation may take place in the presence or absence of a catalyst. The catalyst may be of a metallic type, such as lead ricinoleate, cobalt ricinoleate, manganese ricinoleate, etc.: or it may be of the organic type which produces peroxide, such as alpha-pinene, linseed oil, etc. Oxidation may take place at atmospheric pressure or superatmospheric pressure, i. e., pressures up to or including 200 pounds gauge pressure, and at any temperature slightly above the boiling point of water, for instance, 120 C., up to any temperature which does not produce undue decomposition by pyrolytic reaction.

The time of blowing may be fairly brief, for example, 8–10 hours; or it may be quite extensive, for instance, as long as 10—12—14 days, the longer time periods being employed generally when the temperature is just slightly above the boiling point of water, and when oxidation is with air at atmospheric pressure.

One method of preparing drastically oxidized castor oil is described in U. S. Patent No. 2,023,979, dated December 10, 1935, to Stehr. Also see U. S. Patent No. 2,183,487, dated December 12, 1939, to Colbeth.

Thus, the same conventional procedure or procedures employed for oxidation of castor oil or similar compounds is equally suitable for the blowing or oxidation of hydroxyacetylated triricinolein. In most instances, the period of oxidation may be somewhat longer, although it is also possible to obtain satisfactory products, in which the period of oxidation is somewhat reduced in comparison with the oxidation of castor oil or triricinolein under the same conditions. The application of oxidation is so similar to or identical with that of castor oil, that any differences of manipulation which may be required are perfectly apparent in the ordinary conduct of the process. For instance, if one attempts to oxidize hydroxyacetylated castor oil to obtain the same viscosity as an oxidized castor oil, and if at the end of the predetermined period, the viscosity or other index indicates under-oxidation, naturally the process is continued until the same or a comparable degree of oxidation is obtained. Similarly, in the conventional blowing of castor oil, the last stage of oxidation is somewhat critical and sometimes the period of blowing must be shortened. If, during the oxidation of hydroxyacetylated castor oil, there happens to be an increased or intensive period of reaction, obviously only the ordinary precautions need be taken to prevent over-oxidation. Except for the difference in molecular weight, hydroxyacetylated castor oil presents the same degree of unsaturation as castor oil, and thus the degree of oxidation can be measured, or at least approximated, by the percentage reduction in iodine value, simultaneously with the increase in viscosity.

The production of hydroxyacetylated castor oil is comparatively simple and is comparable to the manufacture of acetylated castor oil, except that hydroxyacetic acid appears to be more reactive than acetic acid, for instance, any suitably selected amount of castor oil may be treated with the appropriate amount of hydroxyacetic acid under conditions to promote esterification and remove any water formed. The usual procedures for promotion of esterification are well known, and involve one or more of the following: Employment of a temperature high enough to eliminate any water formed, for instance, 120–180° C.; sometimes the presence of a strong acid, such as a benzene-sulfonic acid in small amounts acts as a catalyst; sometimes it is expedient to pass an inert dried gas through the reacting mixture; at other times esterification may be conducted in the presence of a high boiling water-insoluble solvent, such as xylene or the like, which assists in removing the water in the form of vapors; the condensate so derived, both from the water vapor and solvent vapor is separated by gravity; and the solvent returned to the reacting chamber for further use.

The selection of suitable amounts of reactants in the manufacture of hydroxyacetylated castor oil is, of course, simple. Castor oil may be analyzed for its triricinolein content by determination of its hydroxyl or acetyl value. Such determination, of course, includes any hydroxy acid compounds other than ricinoleic acid present, but this is immaterial for the present purpose. On the average, castor oil will indicate 85–92% of triricinolein. For convenience in the present instance, one may consider triricinolein as if it were a trihydric alcohol, and thus, one may obtain mono-hydroxyacetylated triricinolein, di-hydroxyacetylated triricinolein, and tri-hydroxyacetylated triricinolein. For practical purposes, of course, there is no economical justification for trying to obtain a technically pure triricinolein and subjecting such material to hydroxyacetylation instead of employing castor oil.

Thus, the product particularly contemplated as a reactant in the present instance, is the compound or compounds obtained by the hydroxyacetylation of castor oil. For purposes of convenience, reference will be made to mono-hydroxyacetylated castor oil, di-hydroxyacetylated castor oil, and tri-hydroxyacetylated castor oil. Examination of the reaction between hydroxyacetic acid and castor oil indicates that water is formed and must be removed. Actually, the water formed may not necessarily be removed instantly, and thus may undergo certain other obvious reactions. Likewise, for reasons of economy, it may be desirable to use a highly concentrated hydroxyacetic acid instead of the anhydrous material as the selected reactant. In such instances, the water would readily enter into hydrolytic reaction with the castor oil, and thus, the product or composition which is actually acetylated may even contain glycerol, in addition to triricinolein. It is not intended, in the present instance, to claim the product obtained by oxidation of hydroxyacetylated glycerol, but it is to be noted that such material may be present cogenerically, for reasons indicated. Earlier reference to the compounds herein contemplated as demulsifiers include the hydroxyacetylated derivatives of ricinoleic acid compounds. These are now suitably qualified to be limited to triricinolein, diricinolein, monoricinolein, and ricinoleic acid, and most particularly, the cogeneric mixture obtained by the hydroxyacetylation of castor oil, including specific members mentioned subsequently.

Although it is believed that in view of what has been said, that no further description is necessary in regard to the manufacture of hydroxyacetylated castor oil, the following examples are included by way of illustration:

*Hydroxyacetylated castor oil—Example 1*

1,000 pounds of castor oil (triricinolein content 88%) is treated with 111 pounds of concentrated hydroxyacetic acid containing 30 percent of water. The reaction is conducted at 200–250 degrees centigrade for approximately 2 hours. Completeness of reaction is indicated by the fact that elimination of water practically ceases, decrease in acid value and hydroxyl value of mixture, and elimination of free hydroxyacetic acid. The procedure is conducted in the usual reaction vessel of the kind employed for esterification, and may be constructed of any material which is resistant to the reactants. The amount of hydroxyacetic acid selected in the present instance is calculated so as to give substantially a mono-hydroxyacetylated castor oil.

*Hydroxyacetylated castor oil—Example 2*

The same procedure is employed as in Example 1, preceding, except that twice the amount of hydroxyacetic acid is employed so as to obtain a di-hydroxyacetylated castor oil.

*Hydroxyacetylated castor oil—Example 3*

The same procedure is followed as in Example 1, preceding, except that three times the amount of hydroxyacetylated castor oil is employed so as as to yield a substantially tri-hydroxyacetylated castor oil.

*Hydroxyacetylated castor oil—Example 4*

The same procedure is followed as in Examples 1 to 3, preceding, except that anhydrous hydroxyacetic acid is employed and water is removed immediately upon formation. The product so obtained represents hydroxyacetylated castor oil, or more especially, hydroxyacetylated tri-ricinolein, in the presence of a minimum amount of hydroxyacetylated cogeners.

It is well known that the exact composition of ordinary oxidized castor oil is not known. This has been a matter of comment from time to time in the literature, including the patent literature dealing with arts in which blown castor oil is contemplated. However, it is obvious that the nature of the products obtained by oxidation of hydroxyacetylated triricinolein or castor oil, must be significantly different from those obtained by the oxidation of castor oil. There are a number of reasons for this statement. One reason is the fact that oxidation, in both instances, involves the alcoholic hydroxyl radical. In the case of castor oil or triricinolein all three alcoholic radicals present are secondary alcoholic radicals. In the case of hydroxyacetylated castor oil, at least one of the three alcoholic radicals present are primary alcoholic radicals, and all three may be primary alcoholic radicals. It is one of the fundamental principles of organic chemistry that the oxidation of primary alcohols yields different products than are obtained by the oxidation of secondary alcohols. In view of this single concept alone, it is obvious that oxidized hydroxyacetylated triricinolein or castor oil must be of a different nature than ordinary oxidized castor oil.

In examining the chemical structure of hydroxyacetic acid, it is instantly recognized that the hydroxyl radical present has replaced an alpha-hydrogen atom, and thus, in the light of the theory of electronegativity, must be particularly susceptible to reaction. This points to a reactiveness on the part of this particular radical which would not necessarily be enjoyed by any primary alcoholic radical.

Then too, previous reference has been made to the fact that one need not employ anhydrous hydroxyacetic acid, but one may employ a concentrated aqueous solution of the kind available commercially. Thus, water enters as a reactant, even though not necessarily so selected. Hence, ultimately one may be concerned with the oxidation of the cogeneric mixture previously described in detail. Incidentally, in such cogeneric mixture, not only may ricinoleic acid be present, as has been pointed out, but one may also have a polyricinoleic acid, such as diricinoleic acid, triricinoleic acid, etc. Such polyricinoleic acids are included within the scope of the expression "ricinoleic acid compound," previously employed.

*Drastically oxidized hydroxyacetylated castor oil—Example 1*

1,000 pounds of a material of the kind described under the heading "Hydroxyacetylated castor oil, Example 1," preceding, is subjected to oxidation in the same conventional manner as employed for castor oil. The temperature employed is 120 degrees C., and the time approximately 223 hours. At the end of a period of oxidation, the product shows a marked increase in viscosity. The usual analytical determinations such as are conventionally employed in connection with the examination of blown castor oil, indicate that drastic oxidation has taken place. The values, so determined, may be conveniently compared with the similar values determined on the hydroxyacetylated castor oil prior to oxidation.

*Drastically oxidized hydroxyacetylated castor oil—Example 2*

The same procedure is followed as in Example 1, preceding, except that one employs as an intermediate material for oxidation the particular hydroxyacetylated castor oil described under the heading "Hydroxyacetylated castor oil, Example 2," preceding.

*Drastically oxidized hydroxyacetylated castor oil—Example 3*

The same procedure is followed as in Example 1, preceding, except that one employs as an intermediate material for oxidation the particular hydroxyacetylated castor oil described under the heading "Hydroxyacetylated castor oil, Example 3," preceding.

*Drastically oxidized hydroxyacetylated castor oil—Example 4*

The same procedure is followed as in Example 1, preceding, except that one employs as an intermediate material for oxidation the particular hydroxyacetylated castor oil described under the heading "Hydroxyacetylated castor oil, Example 4," preceding.

Nothing that has been said previously is intended to suggest that one may not use chemically pure or technically pure triricinolein as a reactant instead of castor oil. It may be used, if desired. Furthermore, one may obtain or prepare diricinolein, either pure or of a technical grade, and such product may be converted into the mono- or poly-hydroxyacetylated derivative. The same applies to monoricinolein. Monohydroxyacetylated ricinoleic acid may also be employed. For obvious reasons, however, nothing is ordinarily gained by using any raw material other than castor oil, and we have found castor oil to yield much more effective demulsifiers than the other materials referred to. Thus, our preference, by far, is to employ castor oil as a reactant.

In view of what has been said, it is obvious that in the hereto appended claims there can not be any satisfactory means of characterizing the products, as such, or for use as demulsifiers, except in terminology, which is related to the method of manufacture.

The expression "drastically oxidized" or "drastic oxidation," as employed in the hereto appended claims, refers to gaseous oxidation by means of an oxygen-containing medium. Such expression does not contemplate wet oxidation, or oxidation by means of permanganate, or other comparable oxidizing agents.

It is furthermore understood that hydroxyacetylation can be conducted by means of the chemical equivalent of hydroxyacetic acid, as well as the acid itself, for example, the anhydride or acylchloride.

Conventional demulsifying agents employed in the treatment of oil field emulsions are used as such, of after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohols, butyl alcohols, hexyl alcohols, octyl alcohols, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifier of the kind above described is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

Attention is directed to the fact that the products herein described as being obtained by the hydroxyacetylation of castor oil by the use of either anhydrous hydroxyacetic acid, or the stronger aqueous solution, results in compounds of the kind disclosed in detail. Such products include, among others, mono- and poly-hydroxyacetylated castor oil, mono- and poly-hydroxyacetylated triricinolein, mono- and poly-hydroxyacetylated superglycerinated castor oil, mono- and poly-hydroxyacetylated monoricinolein, mono- and poly-hydroxyacetylated diricinolein, mono- and poly-hydroxyacetylated castor oil estolides (see U. S. Patent No. 2,079,762, dated May 11, 1937, to De Groote and Keiser), hydroxyacetylated ricinoleic acid, hydroxyacetylated polyricinoleic acid, etc. As far as we are aware, all of such products, or at least certain specific members, are boldly new chemical compounds or new compositions of matter. We have prepared and have in course of preparation, a number of other derivatives in which hydroxyacetylated castor oil or its equivalent serves as an intermediate material for subsequent reaction with some reactant other than oxygen as in the present instance. Such other reactants include, among others, inorganic polybasic acids, including sulfuric acid, phosphoric acid, etc., polybasic carboxy acids, such as phthalic acid, maleic acid, etc., ammonia, amines, etc., and other reactants which result in amino derivatives, polyamino derivatives, amido derivatives, polyamido derivatives, esterified alkanolamines, quaternary compounds, oxyalkylation derivatives, etc., but specifically excluding the type analogous to that disclosed in co-pending application of Charles M. Blair, Jr., Serial No. 353,127, filed August 17, 1940, which has matured into Patent No. 2,306,775, granted December 29, 1942.

For this reason, claims directed to such intermediate products per se, for instance, hydroxyacetylated castor oil, are reserved for inclusion elsewhere. Such intermediate products or reactants considered per se are not intended to include the type in which repetitious hydroxyacetylation akin to repetitious hydroxyalkylation takes place.

Having thus described our invention, what we claim as new and desire to secure by Letters Patent is:

1. A process for breaking petroleum emulsions of the water-in-oil type, characterized by subjecting the emulsion to the action of a demulsifying agent comprising a drastically-oxidized hydroxyacetylated ricinoleic acid compound selected from the class consisting of castor oil, triricinolein, diricinolein, monoricinolein, superglycerinated castor oil, castor oil estolides, polyricinoleic acid and ricinoleic acid.

2. A process for breaking petroleum emulsions of the water-in-oil type, characterized by subjecting the emulsion to the action of a demulsifying agent comprising a drastically-oxidized hydroxyacetylated castor oil.

3. A process for breaking petroleum emulsions of the water-in-oil type, characterized by subjecting the emulsion to the action of a demulsify agent comprising a drastically-oxidized mono-hydroxyacetylated castor oil.

4. A process for breaking petroleum emulsions of the water-in-oil type, characterized by subjecting the emulsion to the action of a demulsifying agent comprising a drastically-oxidized di-hydroxyacetylated castor oil.

5. A process for breaking petroleum emulsions of the water-in-oil type, characterized by subjecting the emulsion to the action of a demulsifying agent comprising a drastically-oxidized tri-hydroxyacetylated castor oil.

MELVIN DE GROOTE.
BERNHARD KEISER.
ARTHUR F. WIRTEL.